United States Patent [19]

Lindberg

[11] 3,760,393
[45] Sept. 18, 1973

[54] OVERHEAT DETECTION SYSTEM
[76] Inventor: John E. Lindberg, 1211 Upper Happy Valley Rd., Lafayette, Calif. 94549
[22] Filed: May 26, 1972
[21] Appl. No.: 257,437

Related U.S. Application Data
[63] Continuation-in-part of Ser. No. 131,976, April 7, 1971, abandoned.

[52] U.S. Cl. ................ 340/229, 337/306, 337/320, 337/332
[51] Int. Cl. ............................................. H01h 37/40
[58] Field of Search ................... 340/229, 227, 228; 337/299, 307, 308, 320, 332; 73/368, 368.2, 368.3; 200/81.5

[56] References Cited
UNITED STATES PATENTS

| | | | |
|---|---|---|---|
| 3,234,537 | 2/1966 | Lindberg | 340/229 |
| 2,536,831 | 1/1951 | Allan | 337/308 |
| 2,493,351 | 1/1950 | Jones | 340/229 |
| 2,641,750 | 6/1953 | Evans | 340/229 X |
| 3,380,045 | 4/1968 | Lindberg | 340/227 |
| 3,390,365 | 6/1968 | Lindberg | 340/229 X |

Primary Examiner—John W. Caldwell
Assistant Examiner—Scott F. Partridge
Attorney—Robert E. Wickersham

[57] ABSTRACT

A fire and overheat detection system. A primary sensor tube and a reference sensor tube each have one closed end and one responder end and contain a solid that reversibly emits gas in gross quantities above a predetermined temperature and takes it back below that temperature, and each has a continuous free space around the solid containing gas. In the primary sensor tube this gas may be at about 2 p.s.i.a., while in the reference sensor tube the gas may be at about 1 p.s.i.a. A primary responder has an electrically conductive primary diaphragm dividing a housing into (1) a first chamber connected to the responder end of the primary sensor tube and provided with a first electrode and (2) a second chamber connected to the responder end of the reference sensor tube and provided with a second electrode, the primary diaphragm normally being out of contact with both electrodes. A confirmation responder has an electrically conductive confirmation diaphragm electrically connected to the second electrode and dividing a housing into a closed third chamber at a fixed low pressure, with a third electrode, and a fourth chamber connected to and at the same pressure as the second chamber and having a fourth electrode, against which the confirmation diaphragm normally rests. Electrically actuable fault warning means is connected on one end to both of the first and fourth electrodes and on the other end to ground, and electrically actuable fire and overheat warning means is connected on one end to the third electrode and on the other end to ground. Electrical potential means is connected to said primary diaphragm.

29 Claims, 8 Drawing Figures

Patented Sept. 18, 1973

FIG_1

FIG_6

FIG_2

FIG_3

FIG_4

FIG_5

OVERHEAT DETECTION SYSTEM

CROSS-REFERENCE TO RELATED APPLICATION

This application is a continuation-in-part of application Ser. No. 131,976, filed Apr. 7, 1971 now abandoned.

BACKGROUND OF THE INVENTION

This invention relates to an improved fire and overheat detection system of the type employing a pneumatic type of sensor.

One of the problems to which the invention is directed occurs in a Lindberg type of fire-detection system having a sensor containing a gas at a pressure above atmospheric. In such systems, when one portion of the sensor is at a high temperature and another portion is still at a low temperature, the emission of gas from the high-temperature portion of a hydride wire contained in the sensor tube and relied upon to provide high pressure at the responder under these conditions, is sometimes nullified by absorption of this gas elsewhere in the system where the hydride is cool. To replace the gas at above-atmospheric pressure in the sensor with gas below atmospheric pressure does not give satisfactory results because the purpose of having the high pressure inside the sensor was that if there should be a leak in the sensor, the pressure inside would drop rather than giving a false warning. If the pressure inside the sensor is low, then in a conventional Lindberg sensor, there is danger that a leak to the atmosphere would increase the pressure above the actuation point and give a false alarm when what should be obtained is a fault alarm. In other words, when the standard system employing a pneumatic sensor is modified to change the pressure inside the sensor tube from above-atmospheric to below-atmospheric, there is a risk that a false fire warning will be obtained by a leak in the sensor. This problem cannot thus be solved by changing pressure inside the sensor, but the present system does solve the problem by providing in combination a primary sensor, a confirmation sensor and a double responder system.

SUMMARY OF THE INVENTION

An important purpose of this system is to provide a rapid response to high temperatures, whether they affect only a short portion of the sensor or affect a longer portion. The purpose may be accomplished in one form of the invention by the use of a primary sensor containing a gas at low pressure and working in conjunction with a reference sensor which contains a gas at lower pressure than that in the primary sensor. The two sensors are combined with a double responder assembly to provide a balanced system. The pneumatic system can operate at very low gas pressures at low temperatures and still be balanced at high gas pressures when the sensor is exposed to high temperatures.

The use of both a primary responder and a confirmation responder, which this system provides, enables the avoidance of many causes of false alarms and enables the giving of fault indications when the system does have faults.

An important feature of the invention is that if the reference sensor leaks while the primary sensor is still intact, the device gives a "fault" indication at all times, but if there should be a fire condition, it also gives the "fire" indication.

Another feature of the invention is that, in preferred forms, the reference sensor and the primary sensor are wound together and are used for mutual support and require no additional support member. Their mutual support is thus achieved by the double helix covered in my U.S. Pat. No. 3,485,101.

Many other interesting features of the invention and other advantages of it, as well as additional objects, will become apparent from the following description of a preferred embodiment.

DESCRIPTION OF SOME PREFERRED EMBODIMENTS

Figure 1:
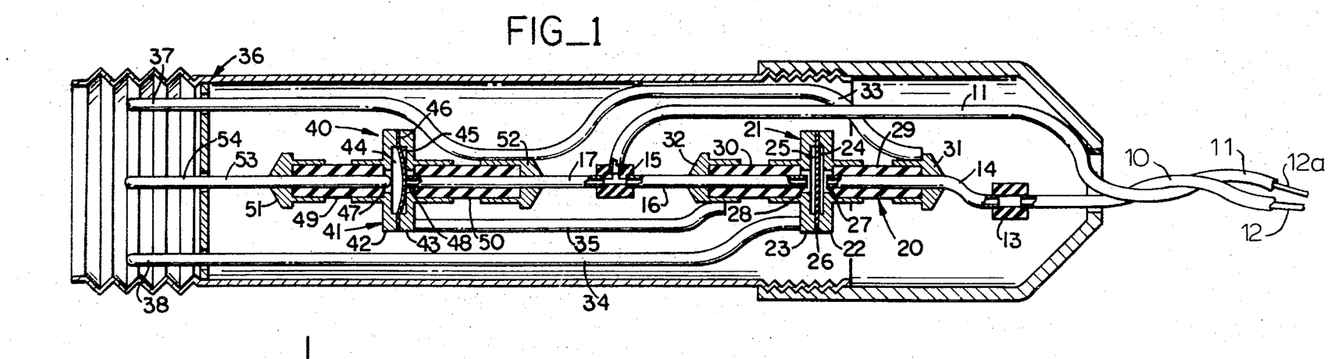
FIG. 1 is a fragmentary view partly in elevation and partly in section of a portion of a fire and overheat detection system embodying the principles of the invention.

As shown in FIG. 1, a primary sensor 10 and a reference sensor 11 are preferably wound together in a double helix so that they support each other, as described and claimed in John E. Lindberg U.S. Pat. No. 3,485,101. Both these sensors 10 and 11 comprise hollow tubes with a closed end and an open end. The primary sensor 10 has, in addition, a wire-like member 12, of the kind which reversibly emits gas above a predetermined temperature and takes it in below that temperature. Thus, it may be, for example, the metallic hydride as disclosed in John E. Lindberg U.S. Pat. No. 3,277,860. The reference sensor 11 also has a member 12a like the member 12.

While the sensors 10 and 11 may be identical, better results can often be obtained by having them different. For example, using tubes of the same wall thickness, the reference sensor 11 may be made with a larger diameter than the primary sensor 10. Thus, in one instance, the reference sensor 11 may have a diameter of 0.093 inch while the primary sensor 10 has a diameter of 0.040 inch. Under these conditions, there is a thermal lag by the reference sensor 11 relative to the primary sensor 10, for it takes longer to heat the larger mass and volume; as a result it becomes possible to obtain faster on and off times. It is generally desirable for the reference sensor to have a smaller gas generating capacity per volume — i.e., a larger volume for the same charge of hydride or a smaller charge for the same volume and/or a greater thermal mass to get slower gas generation on heating and slower gas takeup on cooling in the reference sensor 11. The operation depends upon the differential pressure between the primary sensor 10 and reference sensor 11. Since the small-mass, higher-charge primary sensor 10 heats faster than the reference sensor 11, it generates a pressure increase more quickly; it also cools faster so that the core 12 takes back the gas faster. As a result, the required pressure differential for "on" or for "off" conditions are satisfied much faster. Further, due to the low pressure set points used in this invention, the amount of gas required to be generated by each sensor 10 and 11 is far less and therefore the heat energy required is correspondingly far less, in both the primary and reference sensor-responder systems, than was true in comparable prior-art devices.

The primary sensor 10 is connected to a primary responder 20 by a fitting 13 and tube 14, and the reference sensor 11 is connected to the primary responder 20 by a T-fitting 15 and a tube 16. The primary responder 20 itself comprises a housing 21, which may comprise two metal members 22 and 23, divided into two separate chambers 24 and 25 by an electrically conductive primary diaphragm 26. The diaphragms may be balanced by diaphragm forms in order to compensate for the unbalance of pressure. The two chambers 24 and 25 thus comprise a first chamber 24, which communicates with the primary sensor 10, and into which the open end of the sensor 10 communicates, and a second chamber 25, which is in contact with the open end of the reference sensor 11. Each chamber 24, 25 contains its respective electrode 27, 28, which is electrically insulated from the diaphragm 26, as by members 29 and 30. Thus, the first electrode 27 in the first chamber 24 and the second electrode 28 in the second chamber 25 are both normally out of contact with the primary diaphragm 26, but when the pressure in one chamber 24 or 25 exceeds that in the chamber 25 or 24 by a predetermined amount, then the diaphragm 26 is closed against the electrode 28 or 27 in the chamber 25 or 24 and the device is actuated.

The primary responder 20 may be closed at each end by respective conductive caps 31, 32 which may be electrically connected to the respective electrodes 27 and 28 and separated from the housing members 22, 23 by the insulators 29 and 30. As shown in FIG. 1, the electrode 27 may be part of the tube 14, the fitting 13 preferably being an insulator. Also, the electrode 28 may be part of the tube 16, with the tee 15 an insulator. Or, as shown in FIGS. 2 to 5, the electrodes and tubes may be separate members.

An electrical conductor 33 is electrically connected, as by brazing, to the cap 31 and therefore to the electrode 27. An electrical conductor 34 is electrically connected to the housing 21 and therefore to the diaphragm 26. An electrical conductor 35 is connected to the cap 32 and therefore to the electrode 28. The electrical conductors 33 and 34 extend to a terminal connector 36 where they provide prongs 37 and 38.

The invention also employs a confirmation responder 40 which has a housing 41 comprising two metal members 42 and 43 divided into two chambers 44 and 45 by a diaphragm 46. The chambers 44, 45 have respective electrodes 47 and 48. Again, the diaphragm 46 is preferably metal and in this instance normally rests against the electrode 48 to establish a normal electrical connection there. As in the primary responder 20, so in the confirmation responder 40, there are insulators 49 and 50 and caps 51 and 52 performing the same basic functions as the insulators 29 and 30 and the caps 31 and 32. The electrode 48 may be part of a tube 17, or they may be separate members, but at any rate the chambers 25 and 45 are in direct communication. The electrical conductor 33 is electrically connected as by brazing, to the cap 52, and the electrical conductor 35 is connected to the housing 41. An additional electrical conductor 53 includes the electrode 47 and leads to the connector 36, where it provides a prong 54. The reference sensor is thus connected to the chamber 45, whereas the other chamber 44 is kept at a vacuum. Hence, the chambers 25 and 45 and the reference sensor 11 are all at one pressure, whereas the first chamber 24 and the primary sensor 10 are at another, normally higher, pressure and the chamber 44 is at a vacuum.

Figure 2:
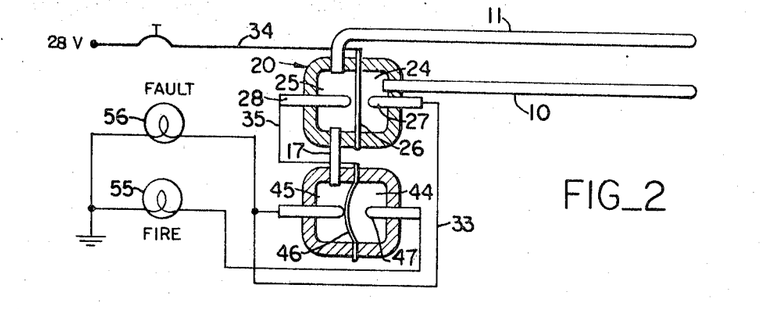
FIG. 2 is a schematic diagram of the electrical circuit combined with a simplified sectional view of the responder assembly, showing the device of FIG. 1 in its normal condition, that is with the temperature below overheat or fire and without any faults in the system.
Figure 3:
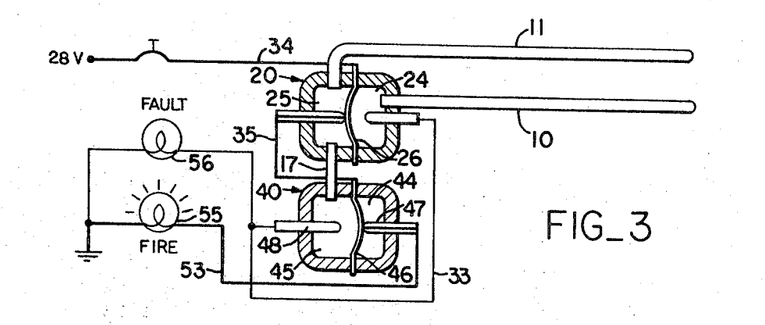
FIG. 3 is a view similar to FIG. 2 showing the system in its alarm condition indicating that there is a fire or overheat condition.
Figure 4:
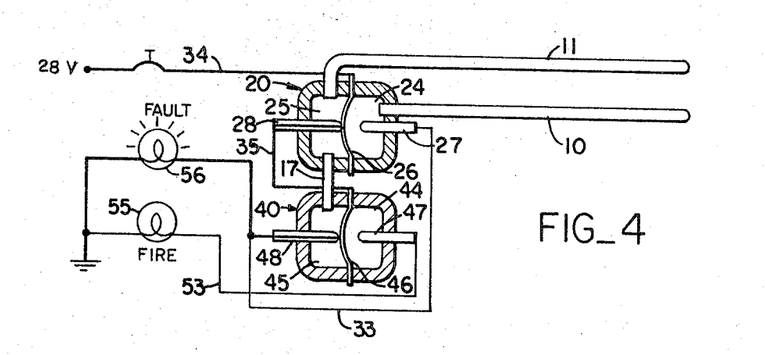
FIG. 4 is a view similar to FIG. 2 showing the system when the primary sensor has a leak in it and atmospheric pressure invades the primary sensor.

A direct-current circuit is used in which the conductor 34 forms part of the plus bus and is connected to the primary diaphragm 26. The negative or ground line is connected to the system in a different manner. There is an alarm device 55, which may be considered as an electrical resistance and may be a signal lamp, and there is a fault device 56 which may be exactly the same kind of device. The electrodes 27 and 48 are both connected to ground through the fault device 56, whereas the electrode 47 is connected to the fire or overheat alarm device 55.

As stated in the introductory portion of this specification, the pressure within the primary sensor 10 is normally well below normal atmospheric pressure. Thus, at about 70° F. the pressure in the primary sensor 10 is typically in the range of 2 to 2.2 p.s.i.a. Although this is well below atmospheric, it is higher than the pressure in the reference sensor 11, which is typically at 70° F. at about 1 p.s.i.a. The pressure in the chamber 44 is substantially at zero p.s.i.a.

Figure 6:
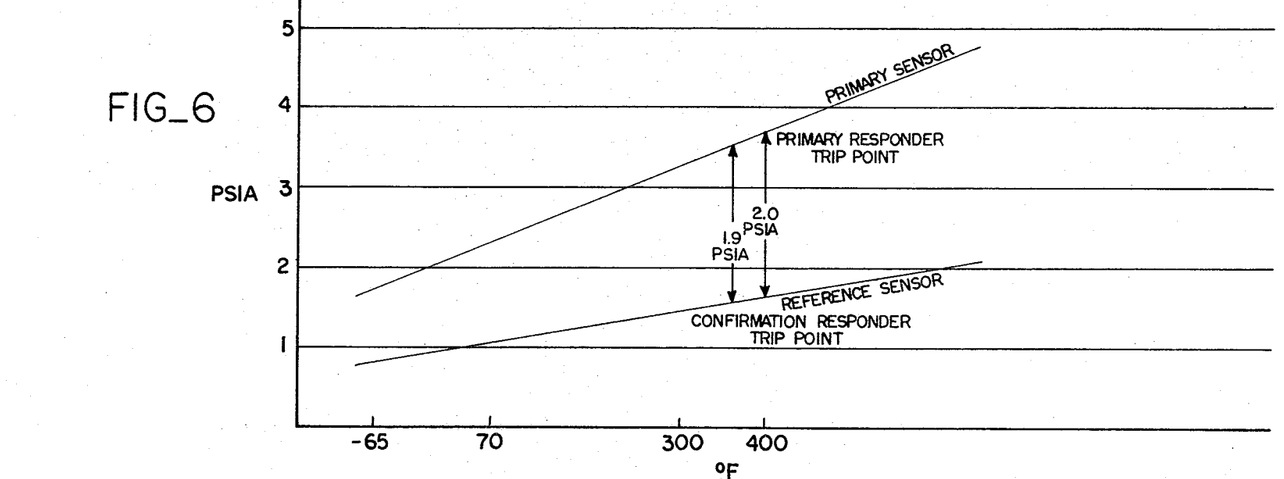
FIG. 6 is a graphical representation of the comparative pressures between the primary and reference sensors during operation from low temperatures to high temperatures, illustrating their divergence in pressures.

Since the initial pressure in the primary sensor 10 is greater than that in the reference sensor 11, there are more gas molecules within it, and as the same temperature acts on both of the sensors 10 and 11 and the internal pressure rises, there is a divergence between their internal pressures as shown in FIG. 6, so that the pressure in the primary sensor 10 under normal conditions not only remains higher than that in the reference sensor 11 but increases at a sharper linear rate. Since the divergence increases in this manner, it is apparent that the divergence itself is a function of temperature, and therefore the average temperature of the sensor combination represents a certain amount of divergence, and the device can be set for this divergence to provide the actuation point at which the primary diaphragm 26 is moved against electrode 28, while at the same time the device can be set so that the confirmation diaphragm 46 at the same temperature is moved by the increase in pressure in the reference sensor 11 to move against the electrode 47. This is the condition shown in FIG. 3, which gives the fire alarm. For example, with the figures just given, this may occur when the pressure in the primary sensor 10 and the chamber 24 reaches a value of 3.6 p.s.i.a., at which time the pressure in the reference sensor 11 reaches a value of 1.6 p.s.i.a., which is 2 p.s.i. lower than that of the primary sensor. This pressure of 1.6 p.s.i.a. is also sufficient to actuate the confirmation diaphragm 46, while the pressure differential of 2 p.s.i. is sufficient to actuate the primary diaphragm 26.

If there should be a very hot flame over a portion only of the two sensors, then the hydride 12 or other material in the primary sensor 10 emits gas at a tremendous rate well exceeding the average amount of inert gas, and (due to the difference in charge or volume or mass) provides an earlier and larger pressure than that provided by gas emission from the material 12a in the reference sensor 11; so the pressure differential between the two sensor-responder systems is increased far above the 2 p.s.i. differential over the pressure in the second chamber 11, and therefore very rapid actuation is achieved under these discrete conditions.

As stated above, a valuable part of this invention is that fault warning indications can be obtained. Suppose, for example, that the primary sensor 10 develops a leak. This leak results in a flow of gas which depends upon the pressure outside the primary sensor 10. If the primary sensor 10 is surrounded by atmospheric pressure or at any pressure level above its normal 2.2 p.s.i.a. level, and if the temperature is in the normal range, then the equalization point will be that of the higher pressure which was outside the sensor 10, and when the device is in conditions short of those at very high altitudes or space conditions, then the conditions shown in FIG. 4 obtain. The primary sensor 10 is leaking, and as a result the pressure increases within the primary sensor 10 and therefore in the chamber 24. This soon causes the primary diaphragm 26 to move against the electrode 28, but since the reference sensor 11 is not affected but is in satisfactory condition, the leak of the primary sensor 10 obviously has nothing to do with the confirmation responder 40, and it stays as it was, with the diaphragm 46 still against the electrode 48. In this instance, therefore, the circuit through the plus bus 40 and conductor 34, the primary diaphragm 26, the electrode 28, the conducting wire 35, the confirmation diaphragm 46, and the electrode 48, light the fault indication warning light 56. However, if there should be a fire condition under these situations, the fault warning will be replaced by a fire warning at the time when the reference sensor 11 is heated to the fire temperature and actuates the confirmation diaphragm 46 to move against the electrode 47. The fact that the operation moves from fault to fire tells the observer that the primary sensor 10 has been faulty and that the fire condition is being obtained in spite of that by the still operable reference sensor 11. This means that appropriate action can be taken both during the fire condition and later to replace the faulty sensor 10.

Figure 5:
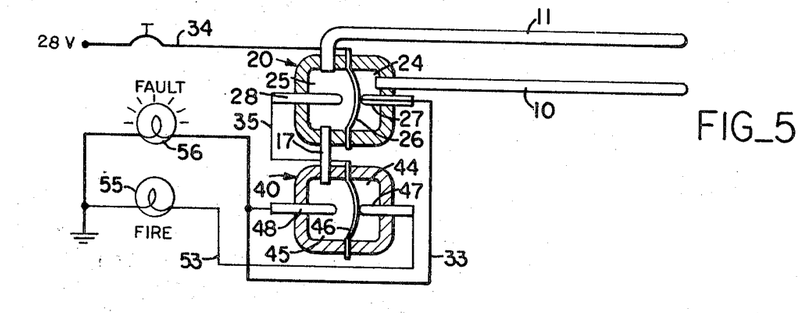
FIG. 5 is a view similar to FIG. 2 showing the system when the reference sensor leaks or both the reference sensor and the primary sensor leak.

If, on the other hand, the reference sensor 11 leaks, or if both of the sensors 10 and 11 leak, then the conditions shown in FIG. 5 will obtain at normal outside temperatures and pressures. The fact that the pressure in the reference sensor 10 is approximately equal to or greater than that in the primary sensor 11, means that the primary diaphragm 26 is moved against the electrode 27, and therefore gives a fault condition warning. This means that at least the reference sensor 11 is leaking, for the primary responder 20 is set so that when the pressure in the reference sensor 11 is equal to or even slightly lower than that in the primary sensor 10, the diaphragm 26 will be moved into this fault indicating position.

However, if the primary sensor 10 is still available for use, it should be noted that the confirmation responder 40 has had its diaphragm 46 moved against the electrode 47 by the increase in pressure in the chamber 45, and the diaphragm 26 is in contact with the electrode 27, thereby producing a fault warning. If fire conditions subsequently occur, then the primary sensor 10 is heated to result in internal pressure above atmospheric pressure, and therefore the circuit can give a fire indication by the moving of the diaphragm 26 against the electrode 28, whereas the confirmation diaphragm 46 stays against the electrode 47. In that case, then, once again the movement is from fault to fire.

Even if both sensors 10 and 11 are leaking it is still possible to get a true warning because there will still be a differential pressure for a while, and when the hydride material is emitting gas, it is emitting very large amounts of gas. Thus, a fire condition can cause outgassing of both of the hydride wires 12 and 12a in the sensors 10 and 11. Flame on both the primary and the reference sensors 10 and 11 causes gas flow even if a small section is heated above the fire discrete-set point. The outgassing causes a differential pressure, which causes a true fire warning.

Since both the primary and reference responders 20 and 40 are set at low pressures and the operating pressure differential is low, the system will operate in fire conditions even though there are leaks — even with fully open ends — much longer than would the systems that were previously set with the operating points above atmospheric pressure.

A modified type of operation can be obtained from the system shown diagrammatically in FIGS. 2-5. The structures would be the same as illustrated there, and would differ from FIG. 1 in that the two sensors 10 and 11 would not be wound together, but would be kept separate and placed in areas which are expected to have different temperatures. The purpose of this modification is to detect when a predetermined difference in temperature takes place, while also continuing to give the fault warnings already described. For this purpose, the two sensors 10 and 11 are preferably identical with identical charges, so that they will have the same pressures in them, and the matter to be determined is when a certain difference in temperature is reached, so that the temperature of the environment to which the sensor 10 is exposed is a certain amount above or below the temperature of the environment to which the sensor 11 is exposed. These environments may be very close to each other, or can be distant from each other. Operation is the same as that described in detail above, except that the actuation indicated as "fire" in FIGS. 2-5 is then an indication that the predetermined differential temperature is reached, and this may or may not indicate the presence of fire. The fault operation is the same as that already described.

The device just described, if used in connection with heating and cooling equipment, can be used to determine a number of things, including rate of cooling of cooling equipment, or rate of heating of heating equipment by measuring the heat gradient between two sensors 10 and 11, one further from a heat source than the other.

Figure 7:
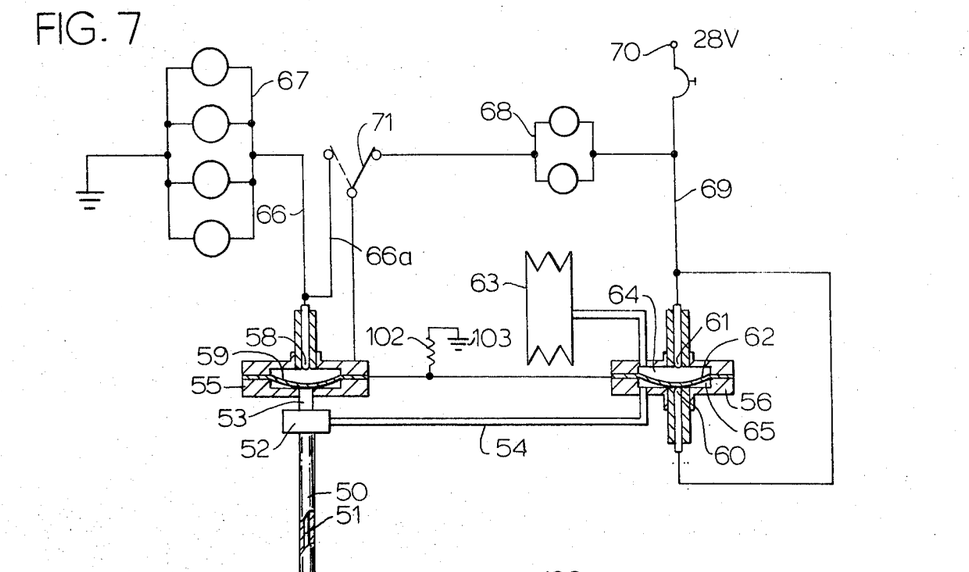
FIG. 7 is a somewhat diagrammatic and somewhat representational view of a modified form of the invention.

FIG. 7 shows a modified system embodying the principles of the invention. Here, a single sensor 50 has a charge of hydride 51 therein, such as a wire of hydride. A ceramic isolator 50 isolates the sensor 50 from two tubes 53 and 54 leading into two different responders 55 and 56. Actually the two responders 55 and 56 may be combined in a single housing if this is desired, but even then they act like two separate members. One of them is an alarm responder 55, and the other is the confirmation responder 56. The alarm responder 55 has a normally open electrode 58 and a diaphragm 59, while the confirmation responder 56 has two electrodes 60 and 61 and a diaphragm 62. The diaphragms 59 and 62 may be actually parts of the same piece of metal, but function as different diaphragms. In addition, the confirmation responder 56 preferably has a sealed soft bellows 63 which keeps the pressure in a chamber 64, on the opposite side of the diaphragm 62 from a chamber 65 connected to the tube 54, substantially equal to the ambient pressure. The confirmation responder diaphragm 62 is normally flat, when the chambers 64 and 65 are at equal pressure, and at this time the pressure in the sensor 50 is the same as the ambient pressure. When the pressure in the sensor 50 is below the ambient pressure, then the diaphragm 62 is cupped downwardly as shown in FIG. 7 and comes to rest on the lower electrode 60; when the pressure in the sensor 50 exceeds the ambient pressure, the diaphragm 62 is moved upwardly and comes to rest against the upper electrode 61.

The electrode 58 of the alarm responder 55 is connected by an electric conductor 66 to an alarm device 67 such as a bank of lights, and both electrodes 60 and 61 of the confirmation responder 56 are connected to a bank 68 of lights through a conductor 69. A source 70 of twenty-eight volt direct current is connected to both electrodes 60 and 61 of the confirmation responder 56. If the sensor 50 is broken, the influx of atmospheric pressure causes the diaphragm 59 to be moved into contact with the electrode 58, while the diaphragm 62 is moved away from the electrode 60. This removal of the shunt circuit through the electrode 60 and diaphragm 59 causes the lighting of the lamps 68 if the test switch 71 is in its closed position shown in solid lines in FIG. 7. If the diaphragm 59 is not in contact with the electrode 58 and if the switch 71 is in its solid-line position in FIG. 7, the current path is from the current source 70 through the lamps 68 and via the switch 71 to a resistor 102 and thence to ground at 103. If the diaphragm 59 is in contact with the diaphragm 58, then the current path is from the lamps 68 and switch 71 to the lead 66 and the lamps 67 and thence to ground. This happens upon breakage of the sensor 50 if it normally is maintained below atmospheric pressure; however, the current demand of the lamps 67 is selected to be approximately half that required by the lamps 68; so the lamps 68 are brightly lighted, while the lamps 67 do not get enough current to light them.

This system can use set points above the ambient pressure. When this is done, the confirmation diaphragm 62 will rest on the upper contact 61 until there is a leak in the sensor 50, and in that condition will then come to the center, removing the shunt circuit through the diaphragm 62, illuminating the light bank 68, with current passing therethrough to the resistor 102 and to the ground 103, and the test switch 71 can be observed to see that it is no test. A fire would still show by moving both the alarm responder diaphragm 58 and the confirmation diaphragm 62 against the top contacts 58 and 61, respectively, to give a fire warning.

This system can be provided with a set point below atmospheric pressure, in which case the confirmation responder diaphragm 62 normally rests on the lower contact 60. These lower set points enable faster response time to be achieved or lower temperature discrete points to be achieved, if needed. Closer spacing of the discrete point and the arithmatic average set points may also be achieved when the system is set below atmospheric pressure. Also, the system has a larger endurance without appreciable setting change, because the diffusion is less at these lower pressures. If a leak should occur in a unit having only an alarm responder 55 and no confirmation responder 56, it would give a false alarm. With the confirmation responder 56 this will not occur; instead, when the leak occurs, the confirmation responder diaphragm 62 is released to its flat off-contact position, and the continuous monitor light 68 goes on. If a fire should later occur, the rapid pressure rise would move both the alarm and the confirmation diaphragms 59 and 62 to the top contacts 58 and 61, respectively, and a fire alarm warning, including the light bank 67, would go on, and the monitor light 68 would go off until the fire is put out.

The limiting factor is not to use the system in an ambient pressure lower than the very low set point. Set points of one and a half p.s.i. have been used, as well as less than one p.s.i.

Figure 8:
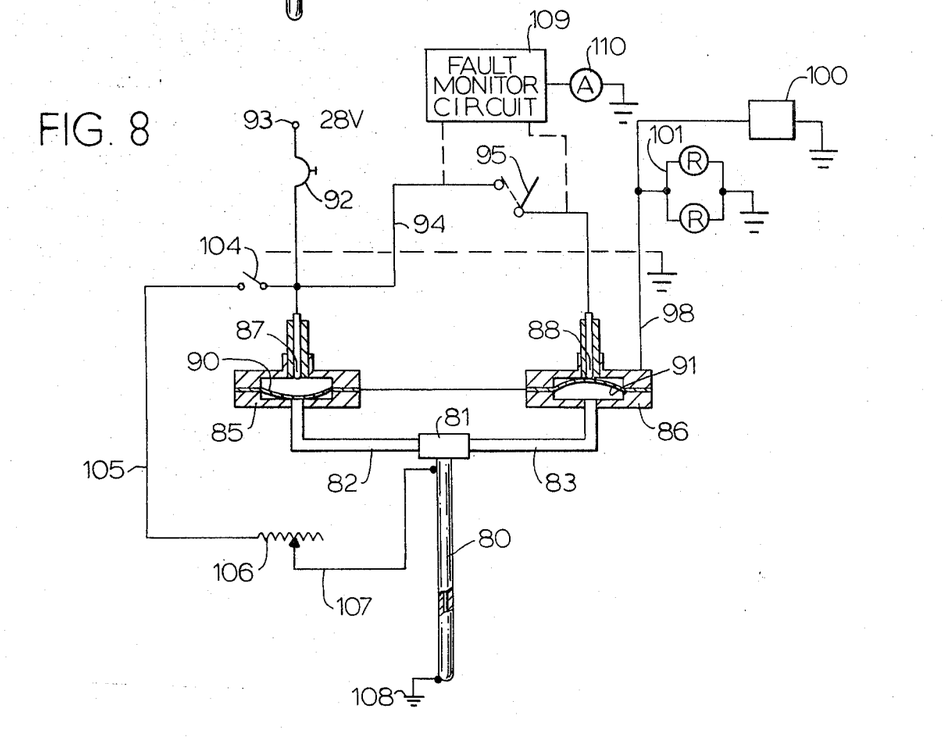
FIG. 8 is a similar view of another modified form of the invention.

FIG. 8 shows another modified system providing the principles of the invention. This is a simplified system having a single sensor 80 with a ceramic isolator 81 connecting it to tubes 82 and 83 that lead, respectively, to an alarm responder 85 and confirmation responder 86. These responders 85 and 86 have respective electodes 87 and 88 and diaphragms 90 and 91. The diaphragms 90 and 91 may be a common piece of metal and may be in a common body; they may even have both diaphragms open into the same chamber, if that is desired. A shunt plate such as described in U.S. Pat. No. 3,196,423 may be used. The electrode 87 of the alarm responder 85 is connected through a circuit breaker 92 to a twenty-eight volt source 93 of direct current and a lead 94 goes from the electrode 87 through a test switch 95 to the electrode 88 of the confirmation responder 86. The housing 86 of the confirmation diaphragm 91 is connected by a lead 98 to a master alarm 100 and to a bank of lights 101, which is connected to ground. The operating point above one atmosphere but less than a sensor overcharge can be used in the confirmation responder 86 so that a leak in the sensor 80 will open the circuit at any altitude as the pressure with the leak is always less than the set point, and so the circuit opens, the system operating thus to monitor the integrity of the system as affected by a loss of pressure due to the leak.

The two operating set points (a higher pressure for the alarm responder and a lower one for the confirmation responder) must both be set above the highest environmental pressure the system will be exposed to. When this is done, the system is very reliable. If this is not done, the system could have a leak and then the ambient pressure could be higher than the set point of the confirmation diaphragm and would close the confirmation diaphragm to give a false test as though it were a real warning, and (if this ambient pressure were even higher than the alarm responder set point) would give a false alarm by closing the alarm diaphragm.

An automatic fault monitor circuit 109 of a type well-known in the art can be applied across the open switch 95. Such a circuit 109 uses the change in current or in voltage in the circuit caused by the opening of the circuit when the diaphragm 91 moves away from the contact 88 upon a break or leakage in the sensor 80. The fault monitor circuit 109 may automatically operate an alarm 110, such as an amber light, when a leak occurs in the sensor 80.

Another circuit goes through a switch 104 and lead 105 to an adjustable resistor 106 and thence via a lead 107 to the end of the sensor 80 near the isolator 81. This circuit provides means for passing a controlled amount of current through the sensor to ground at 108, thereby setting the rate of heating the sensor 80 to match the heating rate of whichever unit in an air-cooled package group is the most critical to keep cool. If the normal cooling airflow is insufficient, the sensor 80 will reach its pre-set operating point, which is set to match the maximum safe operating temperature of this unit which is the most critical to keep cool. At the preset operating temperature, the sensor 80 gives warning. Alternatively, or in addition, it may adjust the cooling system to bring about an automatic increase in cooling, as by automatically increasing the flow of cooling air, or by control of a damper or a valve or of a voltage to a cooling fan, and so on.

To those skilled in the art to which this invention relates, many changes in construction and widely differing embodiments and applications of the invention will suggest themselves without departing from the spirit and scope of the invention. For example, the responders may either close or open to control the warning system. The disclosures and the description herein are purely illustrative and are not intended to be in any sense limiting.

I claim:

1. A fire and overheat detection system including in combination:
   a primary sensor tube having one closed end and one open end,
   a reference sensor tube having one closed end and one open end,
   a primary responder having a housing and an electrically conductive primary diaphragm dividing said housing into (1) a first chamber connected to the open end of said primary sensor tube and provided with a first electrode, and (2) a second chamber connected to the open end of said reference sensor tube and provided with a second electrode, said primary diaphragm normally being out of contact with both said electrodes,
   the pressure within said first chamber and primary sensor tube normally being significantly greater than the pressure within said second chamber and reference sensor tube, and
   a confirmation responder having a housing and an electrically conductive confirmation diaphragm electrically connected to said second electrode and dividing said housing into a closed and sealed third chamber and having a third electrode, and a fourth chamber connected to and at the same pressure as said second chamber and having a fourth electrode against which said confirmation diaphragm normally rests in contact therewith.

2. The system of claim 1 having electrically actuable fault warning means connected on one end to both of said first and fourth electrodes and on the other end to ground,
   electrically actuable fire and overheat warning means connected on one end to said third electrode and on the other end to ground, and
   electrical potential means connected to said primary diaphragm,
   whereby fire or overheat warning is given when (1) the pressure in said primary sensor and said first chamber rises above the pressure in said second chamber sufficiently to force said primary diaphragm into contact with said second electrode and (2) simultaneously the pressure in said reference sensor and in said second and fourth chambers rises to an absolute value high enough to force said confirmation diaphragm against said third electrode, and
   whereby a change in pressure in said primary sensor, as may be caused by a leak in said primary sensor, causes said primary diaphragm to close, either (a) against said first electrode and produce a fault warning whatever the position of said confirmation diaphragm, or (b) against said second electrode while said confirmation rests against said fourth electrode, also producing a fault warning, and
   whereby a leak in said reference sensor when it is in an environment at pressure higher than that within said reference sensor, causes a rise in pressure in said second and fourth chambers to move said primary diaphragm into contact with said first electrode and said confirmation diaphragm into contact with said third electrode, resulting in a fault warning whether or not said primary sensor has a leak, and whereby a leak in said reference sensor when it is in an environment at pressure lower than that within said reference sensor, causes a drop in pressure in said second and fourth chambers to move only said primary diaphragm and to move it in contact with said second electrode, thereby producing a fault warning if said primary sensor is not leaking, or if the primary sensor is also leaking will produce a fault warning by said primary diaphragm moving against said first electrode, while if said primary sensor is operative, fire conditions can raise the pressure in said first chamber above atmospheric and cause said primary diaphragm to move against said second electrode and produce a fire warning.

3. The system of claim 1 wherein said primary and reference sensors are wound together in a double helix to support each other along substantially identical paths in a zone for which detection is desired.

4. The system of claim 1 wherein at 70° F. the pressure inside said primary sensor and said first chamber is approximately 2 p.s.i.a. and the pressure inside said reference sensor and second and fourth chambers is approximately 1 p.s.i.a.

5. The system of claim 4 wherein said primary diaphragm is actuated to close against said second electrode when the pressure in said first chamber exceeds that in said second chamber by about 2 p.s.i., a small preset pressure, and wherein, under normal operation when both sensors and both responders are free from fault, this occurs when the pressure in said fourth chamber has risen to a level that closes said confirmation diaphragm against said third electrode.

6. The system of claim 5 wherein said primary diaphragm is urged into contact with said first electrode when the pressure in said first chamber is less than 0.2 p.s.i. above that in said second chamber.

7. The system of claim 1 wherein each of said primary and reference sensor tubes continuously contains a solid and provides continuous free space and said solid is of the kind that reversibly emits a gas in gross quantities above a predetermined fire temperature and takes it back in below that temperature, thereby producing a marked increase in the pressure in said first chamber when even a short length of said primary sensor is exposed to a temperature above said predetermined fire temperatures.

8. A fire and overheat detection system including in combination:
 a primary sensor tube having one closed end and one open end,
 a reference sensor tube having one closed end and one open end,
 a primary responder having a housing and an electrically conductive primary diaphragm dividing said housing into a first chamber connected to the open end of said primary sensor tube and provided with a first electrode and a second chamber connected to the open end of said reference sensor tube and provided with a second electrode, said primary diaphragm normally being out of contact with both said electrodes and the pressure within said first chamber and primary sensor tube normally being significantly greater than the pressure within said second chamber and reference sensor tube,
 a confirmation responder having a housing and an electrically conductive confirmation diaphragm electrically connected to said second electrode and dividing said housing into a closed third chamber at a pressure below that in said reference sensor, and having a third electrode and a fourth chamber connected to and at the same pressure as said reference sensor and having a fourth electrode against which said confirmation diaphragm normally rests in contact therewith,
 electrically actuable fire and overheat warning means connected on one end to said third electrode and on the other end to ground, and
 electrical potential means connected to said primary diaphragm,
 whereby fire or overheat warning is given when (1) the pressure in said primary sensor and said first chamber rises above the pressure in said second chamber sufficiently to force said primary diaphragm into contact with said second electrode and (2) simultaneously the pressure in said reference sensor and in said second and fourth chambers rises to a value high enough to force said confirmation diaphragm against said third electrode.

9. The system of claim 8 wherein said primary and reference sensors are wound together and extend along substantially identical paths in a zone for which detection is desired.

10. The system of claim 8 wherein said primary diaphragm is actuated to close against said second electrode when the pressure in said first chamber exceeds that in said second chamber by about 2 p.s.i., and wherein under normal operation, when both sensors and both responders are free from fault, this occurs when the pressure in said fourth chamber has risen to a level that closes said confirmation diaphragm against said third electrode.

11. The system of claim 10 wherein said primary diaphragm is urged into contact with said first electrode when the pressure in said first chamber is less than 0.2 p.s.i., above that in said second chamber.

12. The system of claim 8 wherein each of said primary and reference sensor tubes contains solid and continuous free space and said solid is of the kind that reversibly emits a gas in gross quantities above a predetermined fire temperature and takes it back in below that temperature, thereby producing a marked increase in the pressure in said first chamber when even a short length of said primary sensor is exposed to a temperature above said predetermined fire temperature.

13. A fire and overheat detection system, including in combination:
 a primary sensor tube having one closed end and one responder end, said tube containing a solid that reversibly emits gas in gross quantities above a predetermined temperature and takes it back below that temperature, there being a continuous free space around said solid in said primary sensor tube, said free space containing gas at about 2 p.s.i.a.,
 a reference sensor tube having one closed end and one responder end and containing gas at about 1 p.s.i.a.,
 a primary responder having a housing and an electrically conductive primary diaphragm dividing said housing into a first chamber connected to the responder end of said primary sensor tube and provided with a first electrode and a second chamber connected to the responder end of said reference sensor tube and provided with a second electrode, said primary diaphragm normally being out of contact with both said electrodes,
 a confirmation responder having a housing and an electrically conductive confirmation diaphragm electrically connected to said second electrode and dividing said housing into a closed third chamber at vacuum and having a third electrode and a fourth chamber connected to and at the same pressure as said second chamber and having a fourth electrode against which said confirmation diaphragm normally rests in contact therewith,
 electrically actuable fault warning means connected on one end to both of said first and fourth electrodes and on the other end to ground,
 electrically actuable fire and overheat warning means connected on one end to said third electrode and on the other end to ground, and
 electrical potential means connected to said primary diaphragm.

14. The system of claim 13 wherein said primary and reference sensors are wound together in a double helix to support each other along substantially identical paths in a zone for which detection is desired.

15. The system of claim 13 wherein said primary diaphragm is actuated to close against said second electrode when the pressure in said first chamber exceeds that in said second chamber by about 2 p.s.i., and wherein, under normal operation, when both sensors and both responders are free from fault, this occurs when the pressure in said fourth chamber has risen to a level that closes said confirmation diaphragm against said third electrode.

16. The system of claim 13 wherein said primary diaphragm is urged into contact with said first electrode when the pressure in said first chamber is less than 0.2 p.s.i., above that in said second chamber.

17. A fire and overheat detection system including in combination:
 tubular sensor means having one end closed and one end open,
 a primary responder having a housing connected to an open end of said sensor means, and first pressure-responsive means, and
 a confirmation responder having a housing connected to said open end of said sensor means and second pressure-responsive means,
 said first pressure-responsive means being a first metal diaphragm, said primary responder having a first electrode isolated electrically from said first diaphragm and against which said first diaphragm moves to actuate a warning, said first diaphragm normally being out of contact with said first electrode except when actuated by an increase of pressure in said sensor,
 said second pressure-responsive means being a second metal diaphragm electrically connected to said first diaphragm, said confirmation responder having an electrode against which said second diaphragm normally rests, except when moved away therefrom by an abnormal drop of pressure in said sensor.

18. A temperature differential detection system including in combination:
 a first sensor tube having one closed end and one open end,
 a second sensor tube having one closed end and one open end,
 a first responder having a housing and an electrically conductive first diaphragm dividing said housing into (1) a first chamber connected to the open end of said first sensor tube and provided with a first electrode, and (2) a second chamber connected to the open end of said second sensor tube and provided with a second electrode, said first diaphragm normally being out of contact with both said electrodes,
 the pressure within said first chamber and first sensor tube normally being the same as the pressure within said second chamber and second sensor tube, and
 a second responder having a housing and an electrically conductive second diaphragm electrically connected to said second electrode and dividing said housing into a closed and sealed third chamber and having a third electrode, and a fourth chamber connected to and at the same pressure as said second chamber and having a fourth electrode against which said second diaphragm normally rests in contact therewith.

19. A fire and overheat detection system including in combination:
 tubular sensor means having one end closed and one end open,
 a primary responder having a housing connected to an open end of said sensor means, and first pressure-responsive means, and
 a confirmation responder having a housing connected to said open end of said sensor means and second pressure-responsive means,
 said first pressure-responsive means being a first metal diaphragm, said primary responder having a metal housing electrically connected to said first diaphragm and a first electrode isolated electrically from said housing and against which said first diaphragm moves to actuate a warning, said first diaphragm normally being out of contact with said first electrode except when actuated by an increase of pressure in said sensor,
 said second pressure-responsive means being a second metal diaphragm electrically connected to said first diaphragm, said confirmation responder having a metal housing electrically connected to said second diaphragm and an electrode against which said second diaphragm normally rests, except when moved away therefrom by an abnormal drop of pressure in said sensor.

20. The system of claim 19 having
 a current source,
 a first lead connecting said source to said first electrode,
 an alarm system,
 a second lead connecting the housing of said confirmation responder to said alarm system.

21. The system of claim 20 having
 a switch connected on one side to said first lead,
 a third lead connecting the other side of said switch to said second electrode.

22. The system of claim 21 having a fault monitor circuit connected across said switch.

23. The system of claim 20 having
 a switch connected to said first lead,
 an adjustable resistor connected to said sensor near its open end, the closed end of said sensor being grounded, and
 a third lead connecting said switch to said resistor.

24. A fire and overheat detection system including in combination:
 tubular sensor means having one end closed and one end open,
 a primary responder having a housing and an electrically conductive primary diaphragm dividing said housing into (1) a first chamber connected to an open end of said sensor means, and (2) a closed and sealed second chamber provided with a first electrode, said primary diaphragm normally being out of contact with the electrode, and actuated to move thereagainst at a pressure which is different from the ambient pressure,
 a confirmation responder having a housing and an electrically conductive confirmation diaphragm dividing its said housing into a third chamber at ambient pressure and a fourth chamber connected to said open end of said sensor means, and an electrode in one of said third and fourth chambers against which said diaphragm is normally seated and from which it moves away when said sensor reaches said ambient pressure.

25. The system of claim 24 having a third electrode in said chamber of said confirmation responder other than that containing said second electrode, so that whether said sensor is normally above or below said ambient pressure said confirmation diaphragm will be normally seated against a said electrode and will not be seated against either said electrode at ambient pressure.

26. The system of claim 25 having an expandable bellows connected to said third chamber for keeping it at ambient pressure.

27. The system of claim 21, wherein said second and third electrodes are electrically connected together.

28. The system of claim 24 wherein said primary and confirmation diaphragms are electrically connected together.

29. The system of claim 28 wherein a power source is connected to said second electrode, alarm means is connected to said first electrode, a resistor is placed between said diaphragms and ground, and a fault indicator is connected in series between said power source and said primary diaphragm, said fault indicator being actuable at a lower current demand than said alarm.

* * * * *